United States Patent
Coppersmith, III et al.

(10) Patent No.: US 9,072,976 B1
(45) Date of Patent: Jul. 7, 2015

(54) UPDATING VIRTUAL TRADING CARD CHARACTERISTICS

(75) Inventors: Walter Franklin Coppersmith, III, Round Rock, TX (US); Andrew Thomas Busey, Austin, TX (US); Jeffrey Michael Petry, Round Rock, TX (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/408,859

(22) Filed: Feb. 29, 2012
(Under 37 CFR 1.47)

Related U.S. Application Data

(63) Continuation of application No. 12/831,105, filed on Jul. 6, 2010, now Pat. No. 8,905,849.

(60) Provisional application No. 61/223,254, filed on Jul. 6, 2009.

(51) Int. Cl.
A63F 13/00 (2014.01)
A63F 13/80 (2014.01)

(52) U.S. Cl.
CPC .................................. A63F 13/80 (2013.01)

(58) Field of Classification Search
CPC ............ A63F 2300/10; A63F 2300/20; A63F 2300/201; A63F 2300/203; A63F 2300/206; A63F 2300/207; A63F 2300/209; A63F 2300/30; A63F 2300/404; A63F 2300/405; A63F 2300/407; A63F 2300/408; A63F 2300/51; A63F 2300/53; A63F 2300/5593; A63F 2300/6009; A63F 2300/609
USPC .......................................... 463/43, 42, 1–4, 7
See application file for complete search history.

(56) References Cited

U.S. PATENT DOCUMENTS

| 4,951,203 | A | | 8/1990 | Halamka |
| 4,965,727 | A | | 10/1990 | Halamka |
| 5,411,259 | A | * | 5/1995 | Pearson et al. .................. 463/36 |
| 5,533,124 | A | | 7/1996 | Smith et al. |
| 6,200,216 | B1 | | 3/2001 | Peppel |

(Continued)

FOREIGN PATENT DOCUMENTS

| GB | 2359640 A | 8/2001 |
| JP | 8299525 A | 11/1996 |
| JP | 2006174916 A | 7/2007 |

OTHER PUBLICATIONS

"U.S. Appl. No. 12/275,150, Examiner Interview Summary mailed Feb. 16, 2012", 11 pgs.

(Continued)

*Primary Examiner* — Damon Pierce
*Assistant Examiner* — Jeffrey Wong
(74) *Attorney, Agent, or Firm* — Schwegman Lundberg & Woessner, P.A.

(57) ABSTRACT

Systems and methods to update virtual trading card characteristics are described. In some embodiments, a method initiates a game played with multiple virtual trading cards, each of which represents a real-world character. Initial characteristics of each virtual trading card are determined based on historical performance data associated with the real-world character. Current performance data is accessed for each real-world character. The characteristics of each virtual trading card are updated based on the current performance data for the represented real-world character. The game is played based on the updated characteristics for the multiple virtual trading cards.

20 Claims, 7 Drawing Sheets

(56) References Cited

U.S. PATENT DOCUMENTS

| | | | |
|---|---|---|---|
| 6,292,706 | B1 | 9/2001 | Birch et al. |
| 6,735,324 | B1 | 5/2004 | Mckinley et al. |
| 7,204,754 | B2 | 4/2007 | Gray et al. |
| 7,314,407 | B1 | 1/2008 | Pearson |
| 7,372,587 | B1 | 5/2008 | Altrieth, III |
| 7,731,589 | B2 | 6/2010 | Kataoka et al. |
| 7,762,893 | B2 | 7/2010 | Kando et al. |
| 7,862,428 | B2 | 1/2011 | Borge |
| 8,028,315 | B1 | 9/2011 | Barber |
| 8,272,961 | B2 | 9/2012 | Busey et al. |
| 8,328,644 | B2 | 12/2012 | Busey et al. |
| 2002/0142833 | A1 | 10/2002 | Tsuchida et al. |
| 2004/0009817 | A1 | 1/2004 | La Mura et al. |
| 2005/0182693 | A1 | 8/2005 | Alivandi |
| 2006/0003825 | A1 | 1/2006 | Iwasaki et al. |
| 2006/0030959 | A1 | 2/2006 | Duhamel |
| 2006/0189374 | A1 | 8/2006 | Olson |
| 2007/0275782 | A1 | 11/2007 | Kaji et al. |
| 2008/0026847 | A1 | 1/2008 | Mueller et al. |
| 2009/0149248 | A1 | 6/2009 | Busey et al. |
| 2009/0186702 | A1* | 7/2009 | Denk, Jr. ......................... 463/42 |
| 2010/0041481 | A1* | 2/2010 | Smedley et al. ................ 463/42 |
| 2010/0137045 | A2* | 6/2010 | Angelopoulos .................. 463/1 |
| 2012/0015726 | A1 | 1/2012 | Busey et al. |

OTHER PUBLICATIONS

"U.S. Appl. No. 12/275,150, Non Final Office Action mailed Sep. 15, 2011", 24 pgs.

"U.S. Appl. No. 12/275,150, Notice of Allowance mailed May 25, 2012", 13 pgs.

"U.S. Appl. No. 12/275,150, Response filed Feb. 15, 2012 to Non Final Office Action mailed Sep. 15, 2011", 15 pgs.

"U.S. Appl. No. 12/831,105, Non Final Office Action mailed Mar. 5, 2012", 14 pgs.

"U.S. Appl. No. 12/831,105, Response filed Aug. 6, 2012 to Non Final Office Action mailed Mar. 5, 2012", 9 pgs.

"U.S. Appl. No. 13/244,936, Final Office Action mailed Jun. 14, 2012", 10 pgs.

"U.S. Appl. No. 13/244,936, Non Final Office Action mailed Feb. 6, 2012", 25 pgs.

"U.S. Appl. No. 13/244,936, Response filed Jul. 18, 2012 to Final Office Action mailed Jun. 14, 2012", 9 pgs.

"U.S. Appl. No. 13/244,936, Response filed May 4, 2012 to Non Final Office Action mailed Feb. 6, 2012", 18 pgs.

"Duels Official Blog", [Online]. Retrieved from the Internet: <URL: http://web.archive.org/web/20071030040831 /http:/www.duelsblog.com/?m=200710>, (Accessed Oct. 30, 2007).

Arrington, Michael, "Ready to Kill Some Time (And Some Enemies)", Try Duels.com; TechCrunch website, [Online]. Retrieved from the Internet: <URL: http://web.archive.org/web/20070816133427 /http :/www. techcrunch.com/2007/08/06/ready-to-kill-some-time-and-some-enemiestry-duelscom/>, (Aug. 16, 2007).

"U.S. Appl. No. 12/831,105, Final Office Action mailed Oct. 16, 2012", 15 pgs.

"U.S. Appl. No. 12/831,105, Response filed Jan. 16, 2013 to Final Office Action mailed Oct. 16, 2012", 10 pgs.

"U.S. Appl. No. 13/244,936, Notice of Allowance mailed Aug. 9, 2012", 7 pgs.

"U.S. Appl. No. 12/831,105, Final Office Action mailed Dec. 31, 2013", 14 pgs.

"U.S. Appl. No. 12/831,105, Non Final Office Action mailed Jul. 1, 2013", 11 pgs.

"U.S. Appl. No. 12/831,105, Response filed Sep. 30, 2013 to Non Final Office Action mailed Jul. 1, 2013", 11 pgs.

"NBA Live 09 Review HD Quality", [Online] Retrieved From Internet: <https://www.youtube.com/watch?v=i9AjTuJyWxU>, (Dec. 20, 2008).

\* cited by examiner

| Pitching Statistics | |
|---|---|
| AO | Fly Outs (Air) |
| BB | Walks (Bases on Balls) |
| BK | Balks |
| CBO | Combined Shutout |
| CG | Complete Games |
| CGL | Complete Game Losses |
| ER | Earned Runs |
| ERA | Earned Run Average |
| GF | Games Finished |
| GO | Ground Outs |
| GOAO | Ground Outs / Fly Outs Ratio |
| GP | Games Played |
| GS | Games Started |
| H | Hits |
| HBP | Hit Batters |
| HR | Home Runs |
| IBB | Intentional Walks |
| IP | Innings Pitched |
| IRA | Inherited Runs Allowed |
| IPS | Inning Per Start |
| L | Losses |
| MB9 | Baserunners Per 9 Innings |
| OBA | Opponents Batting Average |
| PA | Plate Appearances |
| R | Runs |
| RPF | Relief Failures |
| RW | Relief Wins |
| S/SHO | Shououts |
| SO | Strikeouts |
| SV | Saves |
| SVO | Save Opportunities |
| TB | Total Bases |
| W | Wins |
| WP | Wild Pitches |

| Offensive Statistics | |
|---|---|
| AB | At Bats |
| BB | Bases on Balls (Walks) |
| AVG | Batting Average |
| CS | Caught Stealing |
| 2B | Doubles |
| GIDP | Ground into Double Plays |
| HBP | Hit by Pitch |
| H | Hits |
| HRR | Home Run Ratio |
| HR | Home Runs |
| IBB | Intentional Bases on Balls (Walks) |
| ISO | Isolated Power |
| LOB | Left on Base |
| OBP | On-Base Percentage |
| OPS | On-Base Plus Slugging |
| R | Runs |
| RBI | Runs Batted In |
| SF | Sacrifice Flies |
| SH | Sacrifice Hits (Bunts) |
| S | Singles |
| SLG | Slugging Percentage |
| SB% | Stolen Base Percentage |
| SBR | Stolen Base Runs |
| SB | Stolen Bases |
| SO | Strikeouts |
| TB | Total Bases |
| 3B | Triples |

| Defensive Statistics | |
|---|---|
| A | Assists |
| CS | Caught Stealing |
| DP | Double Plays |
| E | Errors |
| GP | Games Played |
| OFA | Outfield Assists |
| PB | Passed Balls |
| PK | Pickoffs |
| PO | Putouts |
| SB | Stolen Bases (Allowed) |
| TC | Total Chances |
| TP | Triple Plays |

UPDATING VIRTUAL TRADING CARD CHARACTERISTICS

CLAIM OF PRIORITY

This application is a continuation of and claims the benefit of priority under 35 U.S.C. §120 to U.S. patent application Ser. No. 12/831,105, filed on Jul. 6, 2010, which claims the benefit of priority under 35 U.S.C. §119(e) to U.S. Provisional Patent Application Ser. No. 61/223,254, filed on Jul. 6, 2009, the benefit of priority of each of which is claimed hereby, and each of which are incorporated by reference herein in its entirety.

TECHNICAL FIELD

This disclosure relates generally to video games, and, in particular, to such games and other virtual environments simulating real word activities, events, and persons.

BACKGROUND

Online video games generally maintain a record of variable characteristics of characters within the game, e.g., power, health, or points. In particular, some sports video games employ virtual "trading cards" to represent historic performance characteristics of the various virtual athletes as well as an image, team affiliation, name, and other statistics and/or biographical information. As with physical trading cards, virtual trading cards generally are relatively static after their initial creation, except for possible changes as a result of success or defeat within the virtual environment. In some cases, collectible trading cards are associated with fictional characters like virtual heroes or monsters, with no connection, historical or otherwise to real-world events.

Video games are becoming increasingly popular with the proliferation of gaming consoles and personal computers, and games developers are targeting an increasingly wider range of player ages and interests. Accordingly, improvements are sought in gaming interaction and realism.

SUMMARY

The details of one or more embodiments of the present disclosure are set forth in the accompanying drawings and the description below. Other embodiments, features, aspects, objects, and advantages will be apparent from the description and drawings, and from the claims.

Particular embodiments feature "live trading cards" including virtual statistics, attributes, or "characteristics" of a virtual, game-based representation of a real-world sports player, competitor, entity, or other character, which characteristics are updated periodically to reflect or account for a player's real-world performance. By adjusting the virtual characteristics using real-world performance, the characteristics of the sports player's virtual trading card changes in a virtual environment as does a corresponding player's video game performance.

According to particular embodiments, a method of updating virtual performance characteristics includes providing a virtual character representative of a real-world character and establishing performance characteristics for the virtual character based, at least in part, on historic performance of the real-world character. The method further includes measuring subsequent performance of the real-world character; and updating the performance characteristics of the virtual character based, at least in part, on the measured subsequent performance.

In some embodiments, the historic performance is defined by recorded sports competition performance data. In some embodiments, the subsequent performance is official sports competition data. In some embodiments, at least one of the recorded sports competition performance data and the official sports competition data is provided by a professional sports league organization.

In some embodiments, the official sports competition data comprises data recorded for one of a baseball player, football player, soccer player, hockey player, rugby player, golfer, arena football player, jockey, bowler, tennis player, volley ball player, and Olympian. In some embodiments, the method further includes repeatedly altering the performance characteristics of the virtual character based on sequential subsequent performances. In some embodiments, altering the performance characteristic is performed substantially simultaneously with publishing of corresponding official performance data. In some embodiments, altering the performance characteristic is performed at predetermined time intervals.

In some embodiments, the method further includes updating characteristics of multiple virtual characters as team mates or opponents of the virtual character based on corresponding real-world players and carrying out game play based on the updated characteristics of each of the virtual characters.

In some embodiments, the official performance data includes at least one of a batting average, walks, wins, losses, earned runs, outs, games played, hits, home runs, strikeouts, bases stolen, runs batted in, bunts, singles, strikeouts, triples, assists, passes, earned run average, on-base percentage, and slugging percentage.

In some embodiments, the virtual characteristics can include a combination of data from real-world and virtual game outcomes.

According to particular embodiments, a method of updating predictive performance characteristics in a virtual environment includes establishing virtual performance characteristics based on historical real-world performance data, measuring real-world performance to obtain updated real-world performance data, and inputting updated real-world performance data. The method further includes translating the updated real-world performance data into updated virtual performance data, and carrying out virtual game play in a virtual environment base on the updated virtual performance characteristics.

In some embodiments, the virtual environment is a gaining environment. In some embodiments, the gaming environment is a sports game. In some embodiments, the sports game is a fantasy sports game coinciding with a real-world sports tournament/competition. For example, a fantasy baseball team can be composed of virtual players representative of both contemporary real-world athletes and historic athletes. In some embodiments, the virtual environment is a racing simulation environment.

In some embodiments, the method includes altering a heads up display to reflect the updated performance characteristics.

In some embodiments, the virtual characters are automatically assigned positions as a function of historic or real-world events.

In some embodiments, the method further includes varying a virtual or real value of the electronic trading card with the altered performance characteristics.

In some embodiments, the method further includes updating the characteristics in real-time while a real-world tournament is in progress.

In some embodiments, the subsequent performance is official sports competition data. In some embodiments, at least one of the recorded sports competition performance data and the official sports competition data is provided by a professional sports league organization.

In some embodiments, the characteristics are updated in real-time while a real-world tournament is in progress.

In some embodiments, historical performance is translated into statistical performance characteristics used to model virtual sports performance and results in the video game. In particular virtual baseball embodiments, a baseball player "character" has certain performance statistics or attributes that affect how that player/card performs in virtual games, e.g., how often the player strikes out or hits a home run when matched up against other virtual players. These statistics or attributes are updated or adjusted based on the outcome of real-world player performance. For example, if a real-world player hits more home runs than he had in previous seasons, the statistics or attributes on the player's virtual card are updated or adjusted accordingly and the virtual card and corresponding virtual player would perform in virtual games more like the real player in real games.

In some embodiments, the virtual environment is a player-versus-player game. In some embodiments, the virtual environment is a fantasy sports game in which updated real-world inputs determine game play outcomes.

In some embodiments, the virtual or real value of the electronic trading card varies with the altered performance characteristics. In some embodiments, the trading cards are collectible and can be exchanged within a player-to-player card exchange or within a game marketplace.

In some embodiments, a heads up display is also altered to reflect the alteration of the performance characteristics and/or trading card. For example, the heads up display can show information including current health, injuries, end of real-world game changes to characteristics, and the like.

In some embodiments, general performance characteristics of the different characters can include, for example, power, speed, defensive move success rates, and offensive move success rates. These virtual characteristics can be inferred or extrapolated from historical data, or the real-world performance can be measured and subsequently updated to reflect subsequent real-world performance statistics. In some embodiments, the characteristics define specific actions, for example, catches, runs, throws, assists, jumps, blocks, fouls, or any number of other actions from other sports or events. In other embodiments, characteristics include status changes such as trades and draft picks.

Any combination of historic real-world data or current real-world data can be used to create representative characteristics that are directly correlated with, combined with, or inferred from the real-world data. In some embodiments, an increase in a single type of real-world statistic can be used to alter a single corresponding virtual characteristic, or to alter a number of related virtual characteristics. For example, a batting average can be updated per real-world game play and can be a factor in or affect other player characteristics such as overall offensive efficacy or power. Similarly, an announced real-world salary increase, injury, or suspension for a particular player can be considered as a factor in altering trading card characteristics status or values.

In some embodiments, a trading card is the primary data record for storing the virtual characteristics. In some embodiments, the virtual characteristics are established and altered without a virtual "card" representation of the characteristics. In some embodiments, the characteristics are presented in a heads up display. In some embodiments, the alteration in the performance of the virtual player is the only indication of the altering of the virtual characteristics.

In some embodiments, trading cards are selected from a card catalog. In some embodiments, the selected cards are used to form a team roster. In some embodiments, the teams compete in a fantasy sports league or tournament.

In some embodiments, the characteristics of the individual team members are altered.

In some embodiments, performance characteristics of a team as a whole are altered based on alteration of the characteristics for individual team members.

In some embodiments, the real-world players and representative virtual characters are athletes, competitive players, or other sports figures. In other embodiments, a character is a reality TV character, celebrity, or current events figure. In some embodiments, the character is an animal, e.g., race horse, or is a vehicle, e.g., a race car, boat, or plane.

In some embodiments, the virtual environment is a person-to-person game, a simulation, or an action adventure game. In some embodiments, the virtual environment is a role-playing game or a simulation. The virtual characters may be non-player characters (NPCs) controlled by game logic or by inputs of a player.

In particular simulation game embodiments, simulated activities based on the real-world can include flying, sports games, life games, and the like. In some virtual sports game embodiments, individual users control the character(s) of the sport, with the outcome of the game dependant on both user decisions or controls and the altered virtual characteristics. In other embodiments, the users select the character(s) and the game plays out automatically as a function of the altered characteristics of the virtual character and/or the team as a whole.

In some embodiments, a team is selected from a prearranged deck of virtual character trading cards. A user can form multiple teams or squads using multiple decks.

According to particular embodiments, a method of game play includes providing a selection of virtual trading cards, each card defining a set of characteristics of the respective virtual character. The user forms a team of characters from the selection of virtual character trading cards. The user selects an opposing team for game play. Player-to-player simultaneous or asynchronous game play sequences are displayed to the users of each team. In some embodiments, the game play is performed without further user interaction, according to rules defining the interaction of cooperating and opposing characters as a function of characteristics assigned to each character trading card. The performance of the characters and teams in the virtual game, together with any real-world performance updates, are used to alter the virtual trading card characteristics for subsequent game play.

In some embodiments, carrying out game play is asynchronous such that first and second users associated with the opposing teams can observe the game play at different times. In some embodiments, the game play is simultaneous and can include any number of users playing concurrently.

In some embodiments, the cards have predetermined characteristics such that the user need only select the virtual trading cards for a particular game play session and the game play is carried out without further player intervention. In some embodiments, sequential game play between different opposing teams is conducted in a tournament format with the characteristics of the respective virtual trading cards being updated after each round of the tournament.

In some embodiments, selection of one team member, e.g., a leader of a team, alters the characteristics of other team characters or the effect of the characteristics of other team characters during game play.

In some embodiments, a team is composed of at least some representative current sports players, with virtual characteristics updated periodically, e.g., at the end of each real game. In some embodiments, the team includes some historic players for which the virtual characteristics are more static. In some embodiments, an opposing team includes at least one current sports player for which the virtual characteristics are updated based on real-world performance.

In some embodiments, the opposing team is composed of historic sports players and the characteristics of the virtual trading cards are based on historic data. In some embodiments, the opposing team is composed of historic sports players according to historic team rosters for a season, game, inning, or any other suitable length of time.

In some embodiments, the outcome of a given game play sequence or competition is determined by statistical probabilities as a function of the historic data and the updated characteristics.

In some embodiments, a characteristic associated with a virtual trading card is diminished by the frequency of play of the virtual trading card or the duration of play of the virtual trading card.

In some embodiments, the virtual trading cards of each team are randomly ordered to determine pairing of opposing characters in a game play segment. In other embodiments, the virtual trading cards of each team are preordered by the respective user such that opposing characters are paired according to user selected ordering in a game play segment. In some embodiments, characters are assigned positions on a team by the user. In some embodiments, the characters are automatically assigned positions as a function of historic or real-world events.

In some embodiments, the user can preload actions, abilities, and equipment for individual characters. In other embodiments, the user can preselect teams of characters with preloaded relative abilities. In some embodiments, the players' relative abilities are variable depending on the team makeup. For example, a team of characters can have different characteristics, e.g., abilities, actions, defenses, probabilities of success, or equipment, with different leaders.

According to particular embodiments, a computer readable medium contains program instructions for carrying out a method of updating virtual performance characteristics. The method includes providing a virtual character representative of a real-world character and establishing performance characteristics for the virtual character based, at least in part, on historic performance of the real-world character. The method further includes measuring subsequent performance of the real-world character, and updating the performance characteristics of the virtual character based, at least in part, on the measured subsequent performance.

In some embodiments, the method includes providing a selection of virtual character trading cards, each card defining a set of characteristics of each respective virtual character, and allowing a user to form a team of characters from the selection of virtual character trading cards. In some embodiments, the method includes allowing a user to select an opposing team for game play, and displaying to the user and a second user of the opposing team, without further user interaction, game play sequences between the two opposing teams according to rules defining the interaction of cooperating and opposing characters as a function of the characteristics assigned to each virtual character trading card. In some embodiments, the game play can be displayed asynchronously to the users.

According to particular embodiments, a computer readable medium contains program instructions for carrying out a method of updating predictive performance characteristics in a virtual environment. The method includes establishing virtual performance characteristics based on historical real-world performance data, measuring real-world performance to obtain updated real-world performance data, inputting updated real-world performance data, translating the updated real-world performance data into updated virtual performance data, and carrying out virtual game play in a virtual environment based on the updated virtual performance characteristics. In some embodiments, the method further includes providing, for selection by a user, multiple character actions each defining at least one action to be performed by the character, providing a sequence assignment feature for assigning a sequential order to multiple selected actions, and displaying game play according the user's selected actions and sequence assignments, without further user interaction. In some embodiments, the play can be displayed asynchronously to the users.

DESCRIPTION OF DRAWINGS

FIG. 3 is a screenshot showing an embodiment of various offensive and defensive types of virtual performance characteristics.

FIG. 4 is a screenshot showing an embodiment of a team management screen including trading cards for players available for assembly into a team and a team roster.

DETAILED DESCRIPTION

Particular embodiments of the present disclosure are described herein in the example context of sports simulation games. Particular embodiments may be implemented in any number of computer games, gaining environments, or other virtual environments, including action games, sports games, fantasy sports games, role playing games, player versus player strategic games, first person shooter games, episodic games, multiplayer games, real-time strategy games, and the like.

Particular embodiments feature a virtual trading card representing a real-world sports player and statistics or other performance attributes or "characteristics" on the card. Real-world performance information is obtained from any number of sports statistics publishers or data services and is inputted/translated into virtual performance characteristics affecting game play in a game-based model or gaming environment.

Updated real-world performance information is obtained from a statistics publisher, or other suitable source, and the virtual trading card and/or virtual performance characteristics are altered to reflect the updated real-world statistics.

In a particular example, a baseball player is represented on a virtual trading card with historical performance statistics. In the real world, that player continues to perform at certain levels. On a periodic basis, the statistics on the virtual trading cards are updated based on this real-world performance. The game play is conducted according to the performance characteristics listed on the trading card.

In particular embodiments, updating of the virtual trading cards is performed automatically as new real-world statistics are published. For example, statistics are published regularly by a variety of electronic channels, including the internet, text messages, pager messages, RSS feeds, Twitter, television news banners, in addition to printed or broadcasted news media. Any of these data streams or publications can be used to obtain relevant real-world performance information. The relevant information is then input into the virtual environment, via an automated software routine or via manual data entry. The real-world data is translated into corresponding virtual performance characteristics in a game-based model via a software routine or manually. Any number of known database updating techniques can be used to automate any portion of the process. Accordingly, the steps of obtaining real-world data, converting it into game-usable data, and putting it on a virtual trading card for use in game play can be fully automated, partially automated, or performed manually.

Thus, according to particular embodiments, the performance characteristics, e.g., power, value, and performance criteria, on a virtual trading card are not fixed, but rather dynamic based on real-world events.

Figure 1:
FIG. 1 is a screenshot showing an embodiment of a collection of baseball player characters and corresponding virtual trading cards available for assembly into a team.

With reference to FIG. 1, one embodiment of a virtual sports game combines features of fantasy baseball and virtual baseball card collecting. Users can assemble a team from a collection or catalog of available virtual trading cards 10. Virtual baseball trading cards can be purchased or exchanged with other users, or can be received as a prize for winning a game.

Each trading card includes a representation of a real-world player or sports figure and historic performance data, salary, position played, or other performance "characteristics." For example, a Bobby Adams card shows characteristics 12 including salary and third base position (3B) on a card front view.

A first card view or "front of the card" displays a picture, name, team affiliation, and position of the player. A second card view or "back of the card" lists a number of player performance characteristics 12. In a particular example, the card lists power, patience, speed, contact, and defense attributes. Higher power produces extra base hits. Patience measures the ability to draw walks. Broader characteristics can affect other characteristics, for example higher contact rating produces more ball hits in batting. Speed determines the number of bases run or stolen. Higher defense ratings allow a player to steal more hits from an opposing team. A split rating can determine performance against left and right handed pitchers.

Individual cards can include position-specific attributes. For example, a pitcher card can include pitching characteristics such as: miss, stuff, endurance, control, sink, and split. Miss rating determines the pitcher's strike-out ability. Stuff rating determines the reduction of efficacy of an opponent's hits. Endurance rating determines how far a pitcher can pitch into the game. Control rating determines the number of free passes granted to the opposing team. Sink rating determines the number of fly balls and ground ball outs. Split rating determines the pitchers effectiveness against left and right-handed players.

Figure 2:
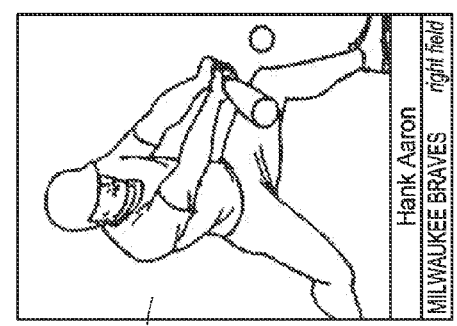
FIG. 2 is a screenshot showing an embodiment of a virtual player trading card with virtual performance characteristics.

With reference to FIGS. 2-3, characteristics 12 can include any relevant historic statistical data. Some example characteristics 12 in a baseball virtual environment include: walks, wins, losses, earned runs, outs, games played, hits, home runs, strikeouts, bases stolen, runs batted in, bunts, singles, strikeouts, triples, assists, passes, batting average, earned run average, on-base percentage, slugging percentage, and the like.

Additionally, characteristics 12 can include more general, blended, or composite characteristics, such as, for example, power, speed, defensive ability, patience, and the like as previously described. Characteristics can include any number of ratios, averages, percentages, or other statistically derived values. Broader composite characteristics can include any number of factors, data, weights, scales, or other variables, and can be used, for example, to provide comparisons of overall ability, talent, power, production, or fielding across leagues and teams from different eras. For example, blending an on-base statistic with a slugging statistic produces a composite characteristic more indicative of actual production. Characteristics can be adjusted by any number of relevant factors or multipliers. For example, a blended on-base and slugging statistic can be divided by a league average and multiplied by a factor to define a relative offensive value. Such weighting, factoring, or smoothing can be used to adjust characteristics between historic and more current characters as a function of relative ability at the time, or simply based on absolute ability. Such characteristics can be used to assign a value to a trading card, both monetary and in-game play.

Accordingly, each virtual character has a number of attributes or characteristics 12 that define the character's skills, performance, abilities, talents, or "Stats." Such characteristics 12 can also include strength, speed, intelligence, ability, performance, equipment, perception, judgment, stamina, resistance, health, power, skill, and the like, and are not confined to the traditionally published sports statistics.

During virtual game play, a user's characters or teams may acquire or improve actions, abilities, or equipment by victory or conquest. Additionally, characteristics 12 are updated, enhanced, improved, diminished, gained, lost, or otherwise altered to correspond more closely with real-world performance of a corresponding real-world person, entity or character, e.g., sports figures, horse or car race competitor, or an entire team.

For example, if a player hits more home runs than he had in previous seasons, the characteristics 12 on the player's virtual card would be updated or adjusted accordingly and the corresponding virtual player would perform in virtual games more like the real player in real games.

Virtual characteristic updates can be provided automatically to a database and associated virtual environment through an electronic data feed of officially published sports statistics, such as those provided by Cadability Pty. Ltd. of Victoria Australia, Infostrada Sports, or other service providers that provide a feed of structured data (e.g., XML formatted data). Alternatively, characteristics 12 can be updated manually by a game administrator. Additionally, users may be allowed to directly update individual characteristics 12.

Particular embodiments include the ability to update a pre-existing virtual characteristic to reflect real-world events in the interim. Stated otherwise, particular embodiments feature a method of updating virtual performance characteristics. The method includes providing a virtual character representative of a real-world character and establishing performance characteristics 12 for the virtual character based, at least in part, on historic or otherwise approximated performance of the real-world character.

Figure 4:
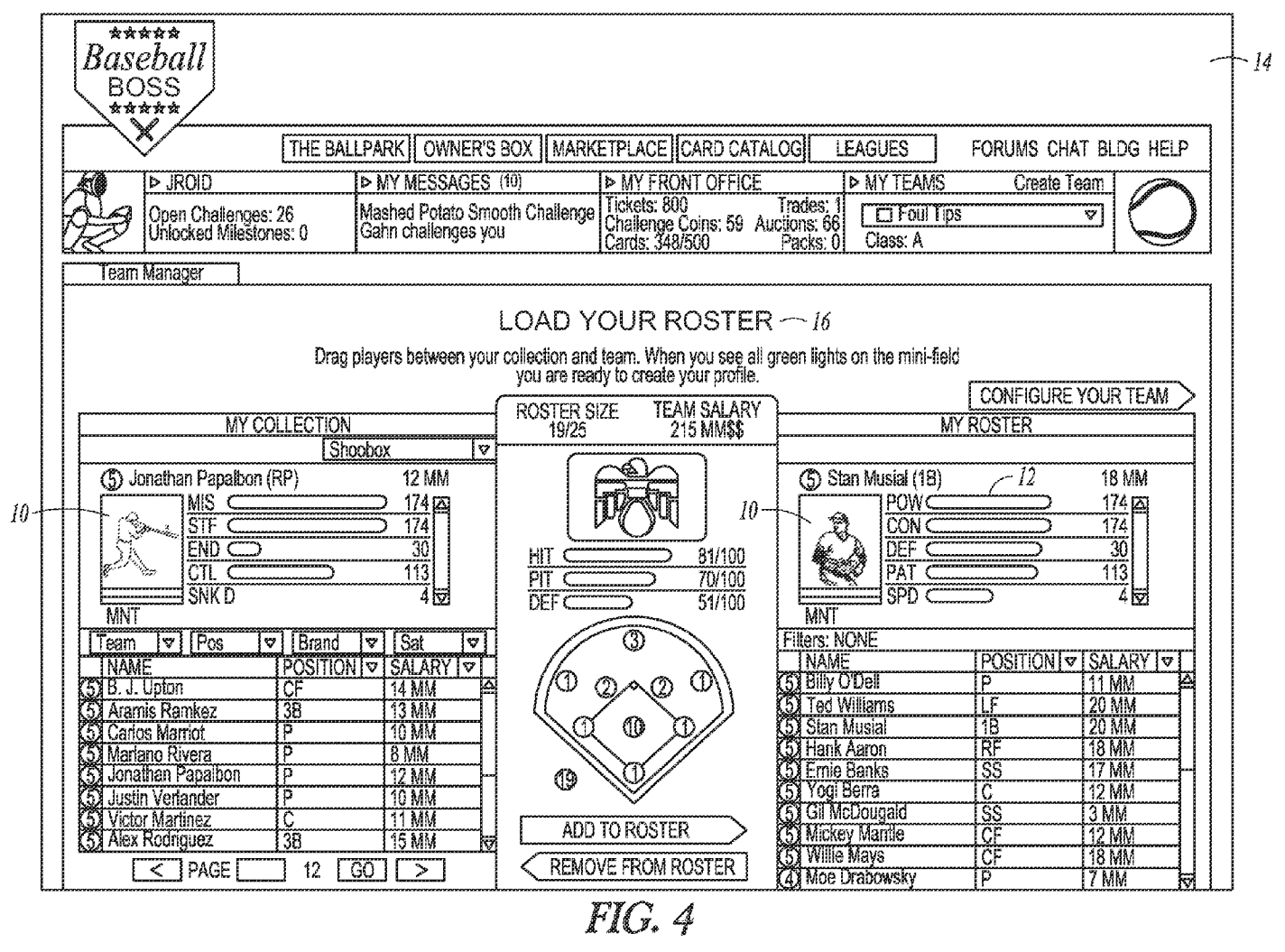

Subsequent performance of the real-world character is then measured, recorded, and communicated to a database associated with the virtual environment of the virtual character to update or alter the performance characteristics 12 of the virtual character. With reference to FIG. 4, characters can be arranged into teams for group competitions. For example, leaders, players, offensive characters, defensive characters, and supporting characters can be arranged into a team to challenge other teams in a sports game. Teams can compete based on the relative characteristics, actions, equipment, defenses, and the like, of the opposing characters and teams in a given game play session.

According to the illustrated embodiment, team owners control the team roster through a team management page or dashboard 14. Team owners can view other teams to select an opponent. Owners can manage their card collection, including buying, selling, and trading cards. A team owner assembles a team by moving cards 10 from a card collection to a team roster 16. The team owner can set the lineups and rotation of team members. Owners can acquire additional cards to supplement a team or to create additional teams. For example, an owner can create a small payroll team, an all old-timers team, or an all Hall of Famers team.

Roster 16 can include multiple pitchers to adjust for degradation of pitcher trading cards as the pitchers experience fatigue within a challenge series. Thus, virtual game play can diminish trading card characteristics, such as card value or power. A starter pack of trading cards can be provided upon registration of a team owner. The owner can formulate a team from the starter pack alone, or can add to the team by collecting other cards. Cards can be acquired using currency accumulated through continued game play and as prizes for winning league competitions and the like.

Team makeup can be limited by player salaries and a team owner's currency. Player salaries can be adjusted based on performance. Different classes of cards can be used to establish different salaries and degradation rates for individual players. Salaries can be adjusted over time or at the end of a season based on how real life players perform, or in accordance with real life salaries.

Animations and/or narratives can be provided for interaction between individual opponents as well as between entire teams. For example, in a spoils context, individual plays as well as entire innings or games can be viewed as an animation with or without a narrative. The narrative can be written or audible and may include tactile feedback if desired.

In a particular example, upon registration in a virtual gaining environment, a user can designate his or her favorite major league team. The user can receive a starter pack of assorted virtual player trading cards 10, each defining virtual characteristics 12 of the respective virtual players. The majority of the pack cards are selected from a chosen team's selected year roster. Players from other eras can be mixed in with current team rosters 16. Users can acquire additional cards 10 or card packs to augment their teams. Cards can be acquired from other players as with traditional card collecting. For example, a particularly desirable card with a higher assigned point value can be traded for multiple trading cards With lower point values through a player-to-player marketplace. Trading cards can be purchased with game currency or by trading with other card collectors. For example, users can buy packs of five cards using accumulated points or game currency. Game currency can be earned through successful game play, scrimmages, milestone participation, or by purchase. Collecting of the virtual trading cards can be diversified with different series, brands, card layouts, and the like. Different card series can be provided with different player characteristics, such as the rate of card degradation mint, near mint, excellent, down to poor). Degradation of the card can result in decreased player performance and card condition can be restored using game currency.

A virtual trading card auction house can allow players to put cards up for auction and to bid on cards that others have listed. The team owner can use collected cards to put together the team(s). The team owner can assign multiple players per position and select a full pitching staff. Once the team is assembled, the owner can challenge other owners, as well as computer-managed historical teams, e.g., teams front 1907, 1957, and 2007. Game play limits can be used to establish a maximum number of times two teams can play per day or per series. The game is simulated to the team owners based on the relative characteristics of each player and team and the winner receives points, tickets, or other game currency based on the game outcome. Game currency is used to collect additional player trading cards. Cards can be purchased as packs, boxes or cases, or as individual cards at an auction or trading page.

The value of the virtual cards can rise or fall based on real-world events. For example, if a rookie has a breakout year and outperforms expectations, the rookie's characteristics would improve, increasing the rookie's virtual trading card value. Similarly, trading card values can decline as well. This fluctuation in virtual trading card values can make the market for sports games more dynamic, realistic, and interesting.

Figure 5:
FIG. 5 is a screenshot showing an embodiment of a league competition feature pane.

With reference to FIG. 5, game play can include a user controlled team, a computer controlled team, two or more user controlled teams, and can be expanded to multi-team league and division play. Competition leagues can be established by different team owners with owner established rules, such as the makeup of teams. Competition can be between teams from different historic leagues, tiers, divisions, or eras. Similarly, users can assemble players into teams from different leagues, divisions, tiers, and eras. Alternatively, a particular tournament may be set up to only allow players from a given league, division, or era.

Leagues can be public and open to any other team owner. Alternatively, leagues can be private with participation only by invited teams. Owners can create multiple teams to enroll in a league, and tournament organizers can create any number of tournament brackets. Tournament rules and properties can be selected by the tournament organizer according to any number of historic, current, or fantasy league sports rules, e.g., single elimination and tie settlement. Joining a league can be free or can require an entrance fee to create a prize pool for the winning teams. Prizes can include game currency or additional cards. A team can be formed for play in a single league with the winning team owners receiving the trading cards for the players assembled in the winning team.

Similarly, leagues can be designated as "private" to require an invitation from the league creator or commissioner to join. This allows friends to create a limited pool for playing as a group. Leagues can be set to last a limited number of days.

In some embodiments, league and tournament play is connected to real-world games. For example, virtual teams can be assigned to the "SEC" or "ACC" and be affected based on how such teams do in a real-world competition, e.g., "March Madness" and tournament brackets.

Additional contests can be provided by the game administrator or arranged between groups of team owners. For example, team owners can create prizes based on prediction of real word MLB game outcomes. For example, a user can guess how many total runs will be scored in a real game to receive a prize pack of trading cards.

While particular embodiments have been described in the example context of baseball, these embodiments may be readily applied in any number of other virtual environments, for example, football game or soccer game, wrestling match, or dance competition. Different player performance characteristics may be selected or asserted for different innings, games, or seasons on a player or team basis. For example, a virtual player can have one set of characteristics for offensive positions and another for defensive positions. The respective characteristics are updated to reflect real-world performance.

Particular embodiments can be applied to updating characteristics including equipment or other inanimate objects. For example, the outcome of in-game matches can have an effect on equipment, e.g., bats, engines, armor, and weapons. For example, if a player performs well, then that player's equipment, weapons, or armor may "improve" as compared to other similar items.

Users can select competition with other users' teams or with computer controlled teams. Team roster data can be displayed, including: Team Name, Salary, Batting Record, Pitching Record, Defense Record, and team Formation Date. Game play can be in the context of a single competition, a league competition, or a scrimmage.

Scrimmaging provides a way to test a team's capabilities against another team. Team owners can scrimmage an opposing team without the opposing team owner accepting a challenge invitation. Scrimmages may not be counted against a win-loss record. Points may still be awarded to the winner of a scrimmage.

Figure 6:
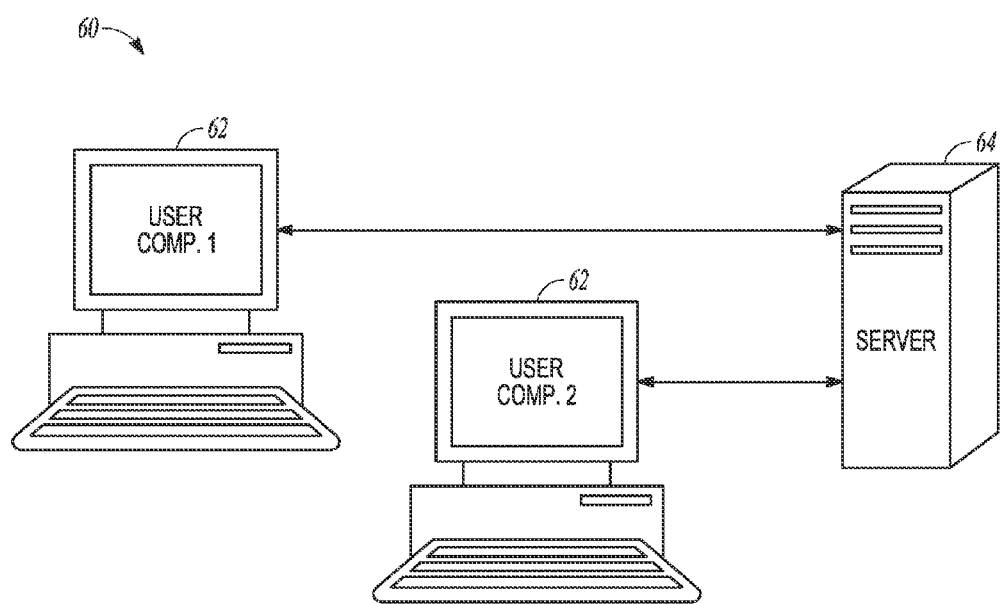
FIG. 6 shows an embodiment of a computer network for use in updating virtual characteristics.

With reference to FIG. 6, a computer network 60 is shown including a user computer(s) 62 connected to a data server 64. According to particular embodiments, a user computer 62 may allow a user to view and/or participate in a video game or simulation. In particular embodiments, the user computer 62 comprises a processor, a cache memory, and one or more software applications and drivers directed to the functions described herein.

Additionally, the user computer 62 includes a high performance input/output (I/O) bus and a standard I/O bus. A host bridge couples the processor to the high performance I/O bus, whereas an I/O bus bridge couples the two buses to each other. A system memory and network/communication interface modules are coupled to the high performance I/O bus. The user computer 62 may further include video memory and a display device coupled to the video memory. A mass storage and an I/O port(s) are coupled to the standard I/O bus. The user computer 62 may optionally include a keyboard and pointing device, and a display device coupled to the standard I/O bus. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of the user computer 62 are described in greater detail below. In particular, the network interface modules provide communication between the user computer 62 and any of a wide range of networks, such as an Ethernet (e.g., IEEE 802.3) network, etc. The mass storage provides permanent storage for the data and programming instructions to perform the above described functions, whereas the system memory (e.g., DRAM) provides temporary storage for the data and programming instructions when executed by the processor. The I/O ports are one or more serial and/or parallel communication ports that provide communication between additional peripheral devices, which may be coupled to the user computer 62.

The user computer 62 may include a variety of system architectures; and various components of the user computer 62 may be rearranged. For example, a cache may be on-chip with the processor. Alternatively, the cache and the processor may be packed together as a "processor module," with the processor being referred to as the "processor core." Furthermore, certain embodiments may not require nor include all of the above components. For example, the peripheral devices described as coupled to the standard I/O bus may couple to the high performance I/O bus. In addition, in some embodiments only a single bus may exist, with the components of the user computer 62 being coupled to the single bus. Furthermore, the user computer 62 may include additional components, such as additional processors, storage devices, or memories. As discussed above, in particular embodiments, the operations of the present disclosure described herein are implemented as a series of software routines run by the user computer 62. These software routines comprise a plurality or series of instructions to be executed by a processor in a hardware system, such as the processor. Initially, the series of instructions are stored on a storage device, such as the mass storage. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via the network/communication interface modules. The instructions are copied from the storage device, such as the mass storage, into the memory and then accessed and executed by the processor.

An operating system manages and controls the operation of the user computer 62, including the input and output of data to and from software applications. The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

The user computer 62 includes any suitable personal computer, gaming console, mobile device, including cellular phones, or processing device. For example, the user computer 62 may include a gaming console, such as a Sony PlayStation®, Microsoft Xbox®, Nintendo Wii®, or any other suitable gaming console, including portable gaming consoles such as the Sony PlayStation Portable®. As such, the user computer 62 may further include one or more I/O devices, such as a controller, game mat, or pointing device, that may allow a user to control the character(s) of the game with the outcome of the game dependant on both user decisions or controls and the altered virtual characteristics. In such an example, a user may control one or more characters throughout a portion of the game or the entire game (e.g., causing the character(s) to throw a pitch, swing at a pitch, move to a particular area, and perform any other suitable action), while the user computer 62 controls one or more of the remaining characters as NPCs. In some embodiments, the user computer 62 may control any of the characters on the user's team that are currently not being controlled by either the user or any other user (e.g., during cooperative play). Additionally, the user computer 62 may also control all of the characters on the opposing team, or all of the characters on the opposing team that are not currently being controlled by another user (e.g., during player versus player game play). As another example, the I/O devices of the user computer 62 may allow a user to select the character(s) and/or other features of the game (e.g., location of the game, starting possession of the ball, particular rules to enforce/eliminate, and the like), and then the game plays out automatically (or with minor input, such as selecting one or more plays of a game) as a function of the altered characteristics of the virtual character and/or the team as a whole.

Data server 64 includes a database of real-world historical data related to performance of real-world individuals, organizations, systems or events, and virtual performance data related to the real-world historical data. The real-world historical data and/or virtual performance data can be transmitted from data server 64 to user computer 62 over network 60 for use in modeling virtual performance and virtual performance characteristics in a virtual environment.

The virtual environment can be hosted on the user computer 62, the data server 64, and/or on another computer accessible over network 60. User computer 62 can be preloaded With historical data or other virtual performance characteristic data, e.g., through installation of a game or other simulation. Alternatively, user computer 62 can download or access the game or simulation and corresponding performance data from data server 64 or other computer over network 60. In particular embodiments, the entire game or simulation (or substantially the entire game or simulation) may be hosted on the user computer 62. As such, the user computer 62 may access the data server 64 in order to receive updates for the virtual performance characteristic data and updates for the game and simulation. In particular embodiments, the entire game or simulation (or substantially the entire game or simulation) may be hosted on the data server 64 or on another computer accessible over network 60. As such, a user may access the game or simulation through a browser running on the user computer 62, e.g., such as a browser using a flash plug-in. In such an example, the data server 64 or the other computer accessible over network 60 may perform any of the tasks discussed above with regard to the user computer 62 (e.g., controlling one or more characters of the game).

Data server 64 is updated with current real-world performance data via a statistics publisher service or via other known data entry methods, including manual entry by a database administrator. For example, current data can be obtained from various websites following each game within each of the relevant leagues, sports, or other competitions or statistically measured events. It may be advantageous for this data gathering to be automated so as to closely follow the measured events, at frequent intervals, or as determined by a system administrator or user preference. The corresponding virtual performance characteristic data is then updated and made available to user computers 62 for use in a virtual gaming environment. For example, the user computer 62, such as a personal computer, gaming console, mobile device, or processing device, may connect to the data server 64 through the network in order to receive or download the updated virtual performance characteristic data, or any other suitable updated data.

In particular embodiments, the user computer 62 may connect to the data server 64 in order to access the updated virtual performance characteristic data at any suitable interval. For example, the user computer 62 may connect to the data server 64 in order to access the updated virtual performance characteristic data as a real-world sports season progresses (e.g., such as a baseball season or a football season). In such an example, the user computer 62 may automatically (or based on prompting by a user) connect to the data server 64 after any suitable length of time since the previous updated virtual performance characteristic data was received, such as after one day, one week, one month, a length of a season, one year, or any other suitable period of time. By connecting to the data server 64 as the real-world sports season progresses, the user computer 62 update the performance characteristics of the virtual characters as the real-world sports season progresses. For example, if one or more statistics of a particular real-world sports figure change during a game or a season (e.g., increase/decrease of their current batting average, increase/decrease their current RBI numbers, or the sports figure is injured), the user computer 62 may access the updated virtual performance character data reflecting these changed statistics the next time the user computer 62 connects to the data server 64. Once the updated performance characteristic data is accessed, the processor of the user computer 62 may update the performance characteristics of the virtual characters using this updated performance characteristic data. In particular embodiments, such updating may result in one or more of the performance characteristics of the virtual characters increasing or decreasing as the real-world sport figure's real-world statistics increase and decrease throughout a real-world season (or from season to season).

Figure 7:
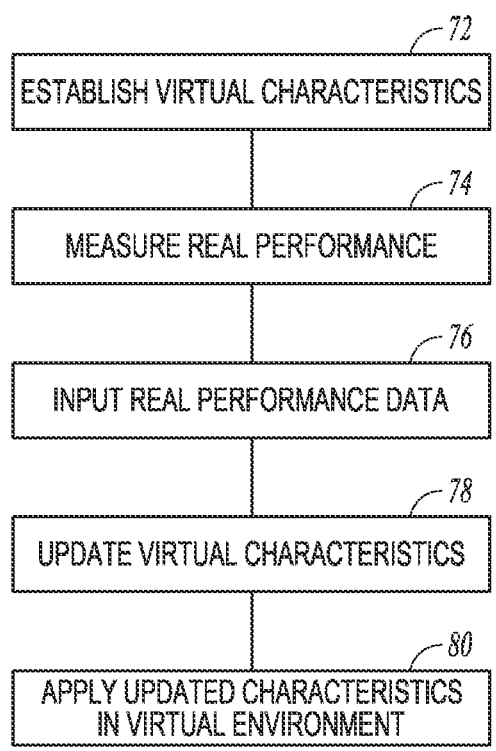
FIG. 7 shows a flowchart of an embodiment of a method for updating virtual performance characteristics. Like reference symbols in the various drawings indicate like elements.

With reference to FIG. 7, in particular embodiments of updating virtual performance characteristic 70, a first set of virtual performance characteristics are established or provided in a database for use within a virtual environment (72). The virtual performance characteristics are representative of measured real-world performance of real-world sports figures, athlete, competitor, organization, event, or the like. The virtual performance characteristics can be stored at any number of locations or in any number of ways known in the art for use in the virtual environment.

Subsequent to providing the virtual performance characteristics (72), real-world performance of the corresponding real-world person, entity, or character is measured (74) or accessed from a data stream to obtain updated real-world performance data. This updated real-world performance data is communicated or input into the database (76). The updated real-world performance data is translated into updated virtual performance characteristics (78). The updated virtual performance characteristics are applied within a virtual environment to determine the performance of one or more corresponding virtual characters (80).

In some embodiments, real-world performance can be measured as cross-team or cross-category metrics. For example, players can be designated as either RED or BLUE teams within a tournament, with the winner of the tournament (e.g., everyone in either the RED or BLUE faction) receiving a bonus characteristics enhancement. Alternatively, more abstract performance connections can be established. For example, if the Ravens win the Super Bowl, baseball teams or selected players of teams with bird-themed logos can receive a bonus characteristic enhancement.

In some embodiments, the real-world and/or virtual performance characteristics are displayed to users in a trading card format. In some embodiments, both real-world and corresponding virtual characteristics are presented. In some embodiments, the characteristics are displayed in a heads up display with a gaming environment. In some embodiments, the characteristics determine the performance of the corresponding virtual character without the need to display a performance characteristic to the user. Thus, particular performance characteristics need not be presented as a trading card or otherwise. It is sufficient that a database of performance characteristics is regularly updated based on real-world performance for use in determining the outcome of game play within a video games environment.

In some embodiments, the updated virtual performance characteristics are presented in a virtual trading card-style display. Updates can include position changes, e.g., third base to short stop, salary, rankings, injuries, suspensions, popularity, and any other sports figure information of interest. For example, a game could use an updated salary of real-world players to "salary cap" virtual teams. Popularity of a player can determine a response of a virtual crowd to a character's performance. Ranking can affect an overall performance enhancement factor. Additional biographic information and images can also be updated.

Historic and updated real-world information can be collected by any number of means, including automated means, public polls, player polls, official publications, blogs, web services, and the like. The virtual characteristics can include a combination of real-world and virtual game outcomes. For example, both real-world and virtual game wins can improve the virtual characteristics of individual team members and the team as a whole. Various embodiments are advantageous in any number of different games or other virtual environments. Racing games can include human characters, e.g., Tour de France or NASCAR, animal characters, e.g., dog races, horse rider pairs, machine and driver pairs, e.g., cars and planes, and other types of competitive characters.

In a particular sporting example, updated characteristics and trading cards are provided during the World Series to provide a predictive model to permit the simulation of remaining games or even a game in progress.

The value of the "live trading cards" fluctuates with the virtual performance characteristics. This can make in-game card trading and auction activities more interesting to game players or other card collectors. The value of the "live trading cards" can be driven by real life events, in-game events, or both.

While embodiments of the "live trading cards," virtual performance characteristics, and real-world performance characteristics have been described in the context of baseball cards, baseball games, baseball players, and real-world baseball games, real-world and virtual performance characteristics can be measured, updated, and applied within any number of virtual environments.

Any number of methods can be used for translating real-world information into usable game data. Updates can be performed at any desired frequency, or upon occurrence of any number of events. The information can be selected or omitted as desired for a given application. For example, in some case, only certain "featured" cards or players are updated at certain times. In some embodiments, a user must earn or pay for updated performance characteristics, e.g., either in real money or cost in game terms. For example, one option is to have users pick a card that he or she wants to update, giving the video game user the choice of collecting or using the card based on its historical performance or current performance.

In some embodiments, game competition or practice can affect the virtual performance characteristics. In particular challenge embodiments, two different types of challenges allow users to elect competitive game play or practice game play for strategy evaluation. "Skirmishes" or scrimmages may not count towards player records but provide opportunities for training, learning, and point accumulation without jeopardizing player records or characteristic levels. A challenge can be extended to an opponent and, if accepted, leads to a competition that shows up on both contestants' public records, impacts rankings, and virtual performance characteristics. A skirmish is a practice challenge, typically lasting fewer rounds and using streamlined options. Skirmishes may be selected to not affect the official record of either team.

In competition, victorious characters or teams may receive equipment, points, or game currency from the defeated character or team. Such rewards can be converted into game currency, trading cards, better equipment, more inventory space, special abilities, and the like. Game currency can be bought to use in the game environment using real money, for example via PayPal.

In particular embodiments, a user may choose to view a game play as an animation or as a narration of turns, game play segments, and outcomes. The animation plays out as a function of preprogrammed criteria, including virtual performance characteristics. In the context of competition with historic sports figures, historic data can be used to determine the outcome of each successive play to determine the outcome of a game. The narration can show a step by step or blow by blow progression of the competition through to completion. The champion character is awarded various tokens, other game currency, or additional game advancement opportunities.

Accordingly, game play may be asynchronous with opposing users initiating, responding to, completing, viewing, and evaluating their respective game play stages and outcomes at entirely different times. Users can elect to view the outcome of a complete challenge or game, view the outcome of different innings, or watch the game play out step by step. In other embodiments, multiple competing users may concurrently interact with the gaming system.

Game play can include fantasy sports simulation and does not require real-world sports game outcomes. Each of the virtual characters has a predetermined set of characteristics such as abilities, powers, defenses, or performance levels. These characteristics can be implemented in a preselected order or according to a statistical probability, for example, based on historic data. Game play is conducted between virtual characters without the need for further user interaction A number of embodiments of the invention have been described. Nevertheless, it will be understood that various modifications may be made without departing from the spirit and scope of the invention. For example, predictive modeling in both competitive and noncompetitive virtual environments can benefit from updated virtual performance characteristics tied to recorded real-world performance characteristics. The virtual environments can be accessed or played on any personal computer, gaming console, mobile device, including cellular phones, or processing device. Accordingly, other embodiments are within the scope of the following claims.

What is claimed is:
1. A computer-implemented method comprising:
 initiating a game played with a plurality of virtual trading cards, each virtual trading card representing a real-world character;
 determining initial characteristics of each virtual trading card, the initial characteristics based on historical performance data associated with the real-world character;
 accessing current performance data for each of the real-world characters, the current performance data subsequent in time to the historical performance data;
 updating, using one or more processors, the characteristics of each virtual trading card based on the current performance data for the represented real-world character;
 accessing virtual game play data for each of the virtual trading cards, the virtual game play data including information about outcomes of previous games played with the plurality of virtual trading cards;

updating the characteristics of each virtual trading card based on the virtual game play data for each of the virtual trading cards; and playing the game based on the updated characteristics of the plurality of virtual trading cards.

2. The computer-implemented method of claim 1, wherein the updating the characteristics of each virtual trading card based on the game play data for each of the virtual trading cards causes the characteristics of at least a portion of the plurality of virtual trading cards to be diminished.

3. The computer-implemented method of claim 1, further comprising:

accessing game practice activities for each of the virtual trading cards; and updating the characteristics of each virtual trading card based on the game practice activities for each of the virtual trading cards.

4. The computer-implemented method of claim 1, wherein the updating the characteristics of each virtual trading card based on virtual game play data occurs at the conclusion of each game.

5. The computer-implemented method of claim 1, wherein accessing current performance data for each of the real-world characters is performed at predetermined time intervals.

6. The computer-implemented method of claim 1, wherein accessing current performance data for each of the real-world characters is performed at the conclusion of each game.

7. The computer-implemented method of claim 1, further comprising:

selecting a portion of the plurality of virtual trading cards as a team for a particular game session; and modifying the characteristics of each of the selected virtual trading cards for that game session based on the selection with the team.

8. The computer-implemented method of claim 1, further comprising:

selecting one of the plurality of virtual trading cards as a team leader for a particular game session, the unselected virtual trading cards being team members for the particular game session; and modifying the characteristics of the unselected virtual trading cards for that game session based on the unselected virtual trading cards being team members.

9. The computer-implemented method of claim 1, wherein each virtual trading card represents a virtual character in the game that is controlled by a user.

10. The computer-implemented method of claim 1, further comprising applying the characteristics of at least one virtual trading card in a second game.

11. The computer-implemented method of claim 1, wherein the game is played asynchronously by a plurality of users.

12. The computer-implemented method of claim 1, wherein the game is played simultaneously by a plurality of users.

13. The computer-implemented method of claim 1, wherein updating the characteristics of each virtual trading card changes a corresponding player's performance in the game.

14. An apparatus comprising:

a memory to store data associated with a plurality of virtual trading cards; and one or more processors coupled to the memory, the one or more processors configured to:

launch a game played with the plurality of virtual trading cards, each virtual trading card representing a real-world character;

determine initial characteristics of each virtual trading card, the initial characteristics based on historical performance data associated with the real-world character;

access current performance data for each of the real-world characters, the current performance data subsequent in time to the historical performance data;

update the characteristics of each virtual trading card based on the current performance data for the represented real-world character;

access virtual game play data for each of the virtual trading cards, the virtual game play data including information about outcomes of previous games played with the plurality of virtual trading cards;

update the characteristics of each virtual trading card based on the virtual game play data; and execute the game based on the updated characteristics of the plurality of virtual trading cards.

15. The apparatus of claim 14, wherein the apparatus includes a computer system configured to support access by a plurality of user computer systems through a network.

16. The apparatus of claim 14, further comprising an interface module coupled to the processor, the interface module to allow a plurality of users to access the apparatus and control a virtual character in the game.

17. The apparatus of claim 16, wherein the virtual character is represented by one of the plurality of virtual trading cards.

18. A non-transitory machine-readable storage medium comprising instructions that, when executed by one or more processors of a machine, cause the machine to perform operations comprising:

initiating a game played with a plurality of virtual trading cards, each virtual trading card representing a real-world character;

determining initial characteristics of each virtual trading card, the initial characteristics based on historical performance data associated with the real-world character;

accessing current performance data for each of the real-world characters, the current performance data subsequent in time to the historical performance data;

updating the characteristics of each virtual trading card based on the current performance data for the represented real-world character;

accessing virtual game play data for each of the virtual trading cards, the virtual game play data including information about outcomes of previous games played with the plurality of virtual trading cards;

updating the characteristics of each virtual trading card based on the virtual game play data for each of the virtual trading cards; and playing the game based on the updated characteristics of the plurality of virtual trading cards.

19. The non-transitory machine-readable storage medium of claim 18, wherein the updating the characteristics of each virtual trading card based on the virtual game play data for each of the virtual trading cards causes the characteristics of at least a portion of the plurality of virtual trading cards to be diminished.

20. The non-transitory machine-readable storage medium of claim 18, wherein each virtual trading card represents a virtual character in the game that is controlled by a user.

* * * * *

UNITED STATES PATENT AND TRADEMARK OFFICE
CERTIFICATE OF CORRECTION

PATENT NO.         : 9,072,976 B1                     Page 1 of 1
APPLICATION NO.    : 13/408859
DATED              : July 7, 2015
INVENTOR(S)        : Coppersmith, III et al.

It is certified that error appears in the above-identified patent and that said Letters Patent is hereby corrected as shown below:

Specification

In column 2, line 50, delete "gaining" and insert --gaming--, therefor

In column 6, line 51, delete "gaining" and insert --gaming--, therefor

In column 9, line 43, delete "spoils" and insert --sports--, therefor

In column 9, line 47-48, delete "gaining" and insert --gaming--, therefor

In column 9, line 58, delete "With" and insert --with--, therefor

In column 10, line 1, delete "mint," and insert --(i.e., mint,--, therefor

In column 10, line 11, delete "front" and insert --from--, therefor

In column 13, line 20, delete "With" and insert --with--, therefor

Signed and Sealed this
Sixteenth Day of February, 2016

Michelle K. Lee
*Director of the United States Patent and Trademark Office*